(12) United States Patent
Tanabe et al.

(10) Patent No.: US 12,208,661 B2
(45) Date of Patent: Jan. 28, 2025

(54) AIR CONDITIONING DEVICE FOR VEHICLE

(71) Applicant: MITSUBISHI HEAVY INDUSTRIES THERMAL SYSTEMS, LTD., Tokyo (JP)

(72) Inventors: Hirotaka Tanabe, Tokyo (JP); Takayuki Kobayashi, Tokyo (JP); Hideaki Tatenoi, Tokyo (JP); Masahiro Ota, Tokyo (JP); Tomoki Hase, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 266 days.

(21) Appl. No.: 17/795,913

(22) PCT Filed: Jan. 28, 2021

(86) PCT No.: PCT/JP2021/003048
§ 371 (c)(1),
(2) Date: Jul. 28, 2022

(87) PCT Pub. No.: WO2021/153672
PCT Pub. Date: Aug. 5, 2021

(65) Prior Publication Data
US 2023/0082212 A1   Mar. 16, 2023

(30) Foreign Application Priority Data
Jan. 31, 2020 (JP) .................. 2020-015526

(51) Int. Cl.
*B60H 1/00* (2006.01)
*B60H 1/14* (2006.01)
*B60H 1/32* (2006.01)

(52) U.S. Cl.
CPC ...... *B60H 1/32284* (2019.05); *B60H 1/00485* (2013.01); *B60H 1/00899* (2013.01); *B60H 1/143* (2013.01); *B60H 2001/00928* (2013.01)

(58) Field of Classification Search
CPC ............ B50H 1/32284; B50H 1/00485; B50H 1/00899; B50H 1/143; B50H 2001/00928
See application file for complete search history.

(56) References Cited

U.S. PATENT DOCUMENTS

| 2016/0031288 A1 | 2/2016 | Nishikawa et al. |
| 2017/0028813 A1 | 2/2017 | Enomoto et al. |
| (Continued) | | |

FOREIGN PATENT DOCUMENTS

| DE | 10 2014 111 971 A1 | 2/2016 |
| EP | 3 438 559 A1 | 2/2019 |
| (Continued) | | |

OTHER PUBLICATIONS

Omi, Vehicle refrigeration cycle device, 2015, Full Document (Year: 2015).*

(Continued)

*Primary Examiner* — Nael N Babaa
(74) *Attorney, Agent, or Firm* — Birch, Stewart, Kolasch & Birch, LLP

(57) ABSTRACT

An air conditioning device for a vehicle includes: a refrigeration cycle including a compressor, a condenser, an expansion valve, and an evaporator through which a refrigerant is sequentially flowed; a high-temperature heat medium circuit through which a high-temperature heat medium has exchanged heat with the refrigerant in the condenser is circulated; a low-temperature heat medium circuit through which a low-temperature heat medium has exchanged heat with the refrigerant in the evaporator is circulated; a connection line connecting the high-temperature heat medium (Continued)

circuit to the low-temperature heat medium circuit; vehicle interior heat exchangers allowed to be introduced the heat medium thereinto; and a switching unit which switches an operation state of the air conditioning device to a first mode allowing to connect the vehicle interior heat exchangers to the high-temperature heat medium circuit, a second mode allowing to connect the vehicle interior heat exchangers to the low-temperature heat medium circuit, or a third mode not allowing to connect the vehicle interior heat exchangers to any one of the high-temperature heat medium circuit and the low-temperature heat medium circuit.

17 Claims, 7 Drawing Sheets

(56) References Cited

U.S. PATENT DOCUMENTS

2017/0253105 A1 9/2017 Allgaeuer et al.
2018/0354344 A1 12/2018 Miura et al.

FOREIGN PATENT DOCUMENTS

| EP | 3 611 446 A1 | 2/2020 | |
|---|---|---|---|
| JP | 50-101226 U | 8/1975 | |
| JP | 2014-020280 A | 2/2014 | |
| JP | 2016132429 A * | 7/2016 | ............ B60H 1/22 |
| JP | 2016-199203 A | 12/2016 | |
| JP | 2017-008847 A | 1/2017 | |
| JP | 2017-106693 A | 6/2017 | |
| JP | 2017-210970 A | 11/2017 | |
| JP | 6233009 B | 11/2017 | |
| JP | 2018-189271 A | 11/2018 | |
| JP | 2018-189365 A | 11/2018 | |
| JP | 6534783 B1 * | 6/2019 | |
| WO | WO 2014/013670 A1 | 1/2014 | |
| WO | WO 2014/167796 A1 | 10/2014 | |
| WO | WO 2016/208550 A1 | 12/2016 | |

OTHER PUBLICATIONS

Kezuka, Air conditioner, 2019, Full Document (Year: 2019).*
International Search Report dated Mar. 30, 2021 issued in Application No. PCT/JP2021/003048 with an English Translation.
Written Opinion dated Mar. 30, 2021 issued in Application No. PCT/JP2021/003048 with an English Translation.

* cited by examiner

AIR CONDITIONING DEVICE FOR VEHICLE

TECHNICAL FIELD

The present disclosure relates to an air conditioning device for a vehicle.

Priority is claimed on Japanese Patent Application No. 2020-015526, filed Jan. 31, 2020, the content of which is incorporated herein by reference.

BACKGROUND ART

As an example of an air conditioning device for a vehicle mounted on a vehicle including an automobile or a truck, one described in Patent Document 1 below is known. The device described in Patent Document 1 includes a refrigeration cycle which includes a compressor, an expansion valve, an evaporator (heat medium cooler), and a condenser (heat medium heater) and in which a refrigerant circulates, a heat medium/air heat exchanger which exchanges heat between a heat medium and air, and a switching unit which changes a flow path of the heat medium.

Moisture may condense on a surface of the heat exchanger disposed on a vehicle interior side during the operation of the above-described air conditioning device for the vehicle. Accordingly, there is a possibility that bacteria and mold may grow.

CITATION LIST

Patent Document(s)

Patent Document 1: Japanese Unexamined Patent Application, First Publication No. 2017-106693

SUMMARY OF INVENTION

Technical Problem

Harmful microorganisms that had grown on the surface of the vehicle interior heat exchanger may give not only produce metabolites that cause foul odors and cause discomfort to users, but may also induce diseases such as allergies and bronchitis. Conventionally, in order to avoid such an adverse effect, it has been necessary to periodically clean the heat exchanger or drain pan.

The present disclosure has been made to solve the above-described problems and an object thereof is to provide an air conditioning device for a vehicle capable of performing a hygienic operation for a longer period.

Solution to Problem

In order to solve the above-described problems, an air conditioning device for a vehicle according to the present disclosure includes: a refrigeration cycle including a compressor, a condenser, an expansion valve, and an evaporator through which a refrigerant is sequentially flowed; a high-temperature heat medium circuit through which a high-temperature heat medium has exchanged heat with the refrigerant in the condenser is circulated; a low-temperature heat medium circuit through which a low-temperature heat medium has exchanged heat with the refrigerant in the evaporator is circulated; a connection line connecting the high-temperature heat medium circuit to the low-temperature heat medium circuit; a plurality of vehicle interior heat exchangers which are allowed to be introduced the heat medium thereinto; and a switching unit which is configured to switch an operation state of the air conditioning device to a first mode allowing to connect the vehicle interior heat exchangers to the high-temperature heat medium circuit, a second mode allowing to connect the vehicle interior heat exchangers to the low-temperature heat medium circuit, and a third mode not allowing to connect the vehicle interior heat exchangers to any one of the high-temperature heat medium circuit and the low-temperature heat medium circuit.

Advantageous Effects of Invention

According to the air conditioning device for the vehicle of the present disclosure, it is possible to perform a hygienic operation for a longer period.

DESCRIPTION OF EMBODIMENTS (Configuration of Air Conditioning Device for Vehicle)

Figure 1:
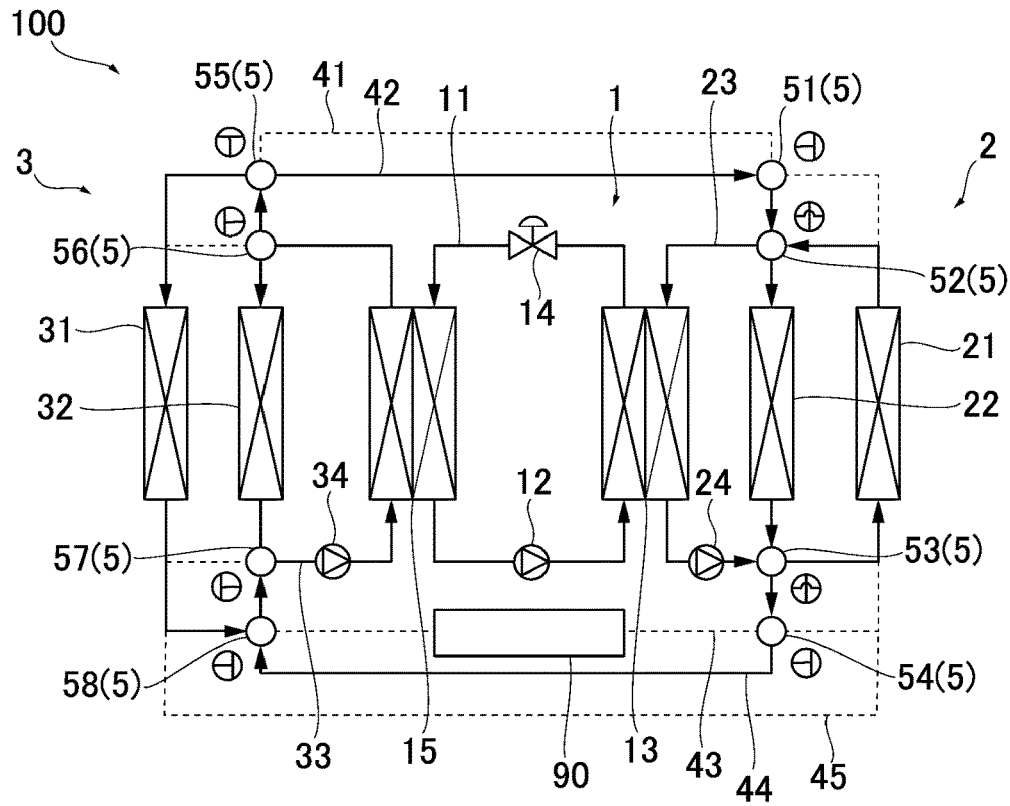
FIG. 1 is a system diagram showing a configuration of an air conditioning device for a vehicle according to an embodiment of the present disclosure and is a diagram showing a state in which a second vehicle interior heat exchanger (heater core) is frozen.

Hereinafter, an air conditioning device 100 for a vehicle according to an embodiment of the present disclosure will be described with reference to FIGS. 1 to 13. The air conditioning device 100 for the vehicle is mounted on a transport machine (vehicle) such as an automobile or a truck. That is, this air conditioning device 100 for the vehicle adjusts the temperature difference between the inside and outside of the vehicle. As shown in FIG. 1, the air conditioning device 100 for the vehicle includes a refrigeration cycle 1, a high-temperature heat medium circuit 2, a low-temperature heat medium circuit 3, a first connection line 41, a second connection line 42, a third connection line 43, a fourth connection line 44, and a switching unit 5. Additionally, in FIGS. 1 to 3, the pipes that are open are indicated by solid lines and the pipes that are closed are indicated by dashed lines.

The refrigeration cycle 1 includes a refrigerant line 11 which is a pipe through which a refrigerant is circulated, a compressor 12 which is disposed on the refrigerant line 11, a condenser 13, an expansion valve 14, and an evaporator 15. The compressor 12, the condenser 13, the expansion valve 14, and the evaporator 15 are arranged in this order on the refrigerant line 11. Further, when the refrigeration cycle 1 is in operation, the refrigerant also passes through each device in this order.

The compressor 12 feeds the refrigerant in the refrigerant line 11 with increasing the pressure thereof. Accordingly, the pressure and temperature of the refrigerant after passing through the compressor 12 rises as compared with the refrigerant before passing through the compressor. The condenser 13 exchanges heat between the refrigerant flowing into the condenser 13 and the cooling water (described later) flowing through the high-temperature heat medium circuit 2. The expansion valve 14 sharply decreases the temperature by decreasing the pressure of the refrigerant passing through the expansion valve 14. The evaporator 15 exchanges heat between the refrigerant flowing into the evaporator 15 and the heat medium (described later) flowing through the low-temperature heat medium circuit 3.

The high-temperature heat medium circuit 2 includes a high-temperature heat medium line 23 through which cooling water is introduced to the condenser 13, a cooler core 22 (first vehicle interior heat exchanger) and a heater core 21 (second vehicle interior heat exchanger) which are arranged in parallel on the high-temperature heat medium line 23, and a high-temperature heat medium pump 24 which feeds cooling water with increasing the pressure thereof. That is, the heat medium flowing out of the condenser 13 can be branched and flowed toward each of the heater core 21 and the cooler core 22. The heater core 21 and the cooler core 22 are heat exchangers arranged on the vehicle interior side. The heater core 21 and the cooler core 22 exchange heat between the indoor/outdoor air and to the cooling water. Additionally, it is possible to perform an operation of increasing a room temperature while suppressing an increase in indoor humidity in such a manner that the cooler core 22 first cools the air to remove the moisture and then the heater core 21 heats the air in the heating operation.

The low-temperature heat medium circuit 3 includes a low-temperature heat medium line 33 through which cooling water is introduced to the evaporator 15, a first vehicle exterior heat exchanger 31 and a second vehicle exterior heat exchanger 32 which are arranged in parallel on the low-temperature heat medium line 33, and a low-temperature heat medium pump 34 which feeds a heat medium with increasing the pressure thereof. That is, the cooling water flowing out of the evaporator 15 can be branched and flowed toward each of the first vehicle exterior heat exchanger 31 and the second vehicle exterior heat exchanger 32. The first vehicle exterior heat exchanger 31 and the second vehicle exterior heat exchanger 32 are heat exchangers arranged on the vehicle exterior side. The first vehicle exterior heat exchanger 31 and the second vehicle exterior heat exchanger 32 exchange heat between the outdoor air and the heat medium.

The first connection line 41 and the second connection line 42 are pipes which connect the high-temperature heat medium circuit 2 to the low-temperature heat medium circuit 3. That is, the heat medium flows through the first connection line 41 and the second connection line 42. The first connection line 41 and the second connection line 42 are parallel to each other. That is, the high-temperature heat medium circuit 2 and the low-temperature heat medium circuit 3 can be connected by at least one of the first connection line 41 and the second connection line 42 in accordance with the selected operation state (operation mode) of the air conditioning device 100 for the vehicle.

The third connection line 43 and the fourth connection line 44 are also pipes which connect the high-temperature heat medium circuit 2 to the low-temperature heat medium circuit 3. That is, the heat medium flows through the third connection line 43 and the fourth connection line 44. The third connection line 43 and the fourth connection line 44 are parallel to each other. That is, the high-temperature heat medium circuit 2 and the low-temperature heat medium circuit 3 can be connected by at least one of the third connection line 43 and the fourth connection line 44 in addition to at least one of the first connection line 41 and the second connection line 42 in accordance with the selected operation state (operation mode) of the air conditioning device 100 for the vehicle. Further, in this embodiment, an in-vehicle device 90 which is an auxiliary device of the vehicle is disposed only on the third connection line 43. A detailed example of the in-vehicle device 90 is a battery.

The fifth connection line 45 connects the high-temperature heat medium circuit 2 and the low-temperature heat medium circuit 3 by bypassing the third connection line 43 and the fourth connection line 44.

The path of the cooling water flowing through the high-temperature heat medium circuit 2, the low-temperature heat medium circuit 3, the first connection line 41, the second connection line 42, the third connection line 43, the fourth connection line 44, and the fifth connection line 45 can be switched by the switching unit 5. In other words, the operation state (operation mode) of the air conditioning device 100 for the vehicle is switched by switching the cooling water flowing path.

The switching unit 5 is a valve device (switching valve) capable of switching the flow state of the cooling water between flow paths to which the switching unit 5 is connected. As shown in FIG. 1, in this embodiment, each switching unit 5 is provided for each of a plurality of (eight) connection portions connecting each flow path. In these eight switching units 5, the switching unit 5 provided at the connection portion on the side close to the cooler core 22 in two connection portions of the first connection line 41 and the second connection line 42 is a first valve device 51.

The switching units 5 provided at two branch points between the heater core 21 and the cooler core 22 of the high-temperature heat medium circuit 2 are respectively a second valve device 52 and a third valve device 53. The third valve device 53 is provided at the branch point between the heater core 21 and the condenser 13 and on the installation side of the high-temperature heat medium pump 24. The second valve device 52 is provided at the branch point between the cooler core 22 and the condenser 13 and on the non-installation side of the high-temperature heat medium pump 24.

The switching unit 5 provided at the connection portion on the side close to the cooler core 22 in two connection portions of the third connection line 43 and the fourth connection line 44 is a fourth valve device 54.

Similarly, the switching unit 5 provided at the connection portion on the side close to the second vehicle exterior heat exchanger 32 in two connection portions of the first connection line 41 and the second connection line 42 is a fifth valve device 55.

The switching units 5 provided at two branch points between the first vehicle exterior heat exchanger 31 and the second vehicle exterior heat exchanger 32 of the low-temperature heat medium circuit 3 are respectively a sixth valve device 56 and a seventh valve device 57. The sixth valve device 56 is provided at the branch point between the first vehicle exterior heat exchanger 31 and the second vehicle exterior heat exchanger 32 and on the installation side of the low-temperature heat medium pump 34. The seventh valve device 57 is provided at the branch point between the first vehicle exterior heat exchanger 31 and the second vehicle exterior heat exchanger 32 and on the non-installation side of the low-temperature heat medium pump 34.

The switching unit 5 provided at the connection portion on the side close to the second vehicle exterior heat exchanger 32 in two connection portions of the third connection line 43 and the fourth connection line 44 is an eighth valve device 58.

Figure 2:
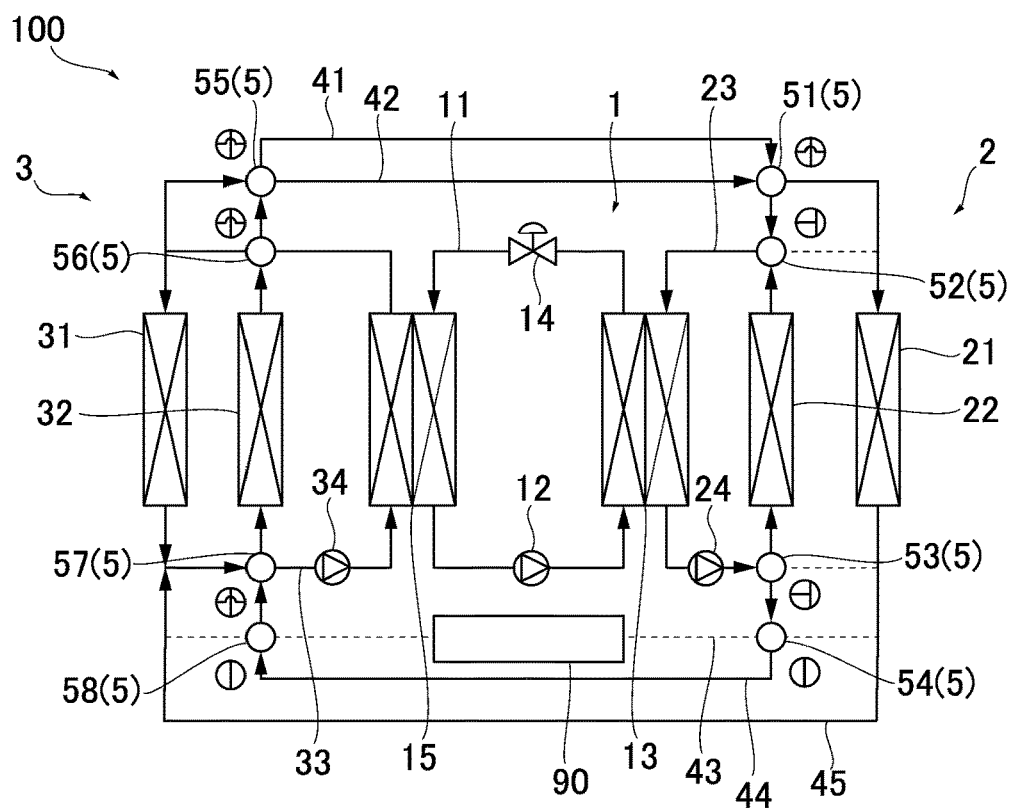
FIG. 2 is a system diagram showing a configuration of the air conditioning device for the vehicle according to the embodiment of the present disclosure and is a diagram showing a state in which the second vehicle interior heat exchanger (heater core) is defrosted and a first vehicle interior heat exchanger (cooler core) is frozen.
Figure 3:
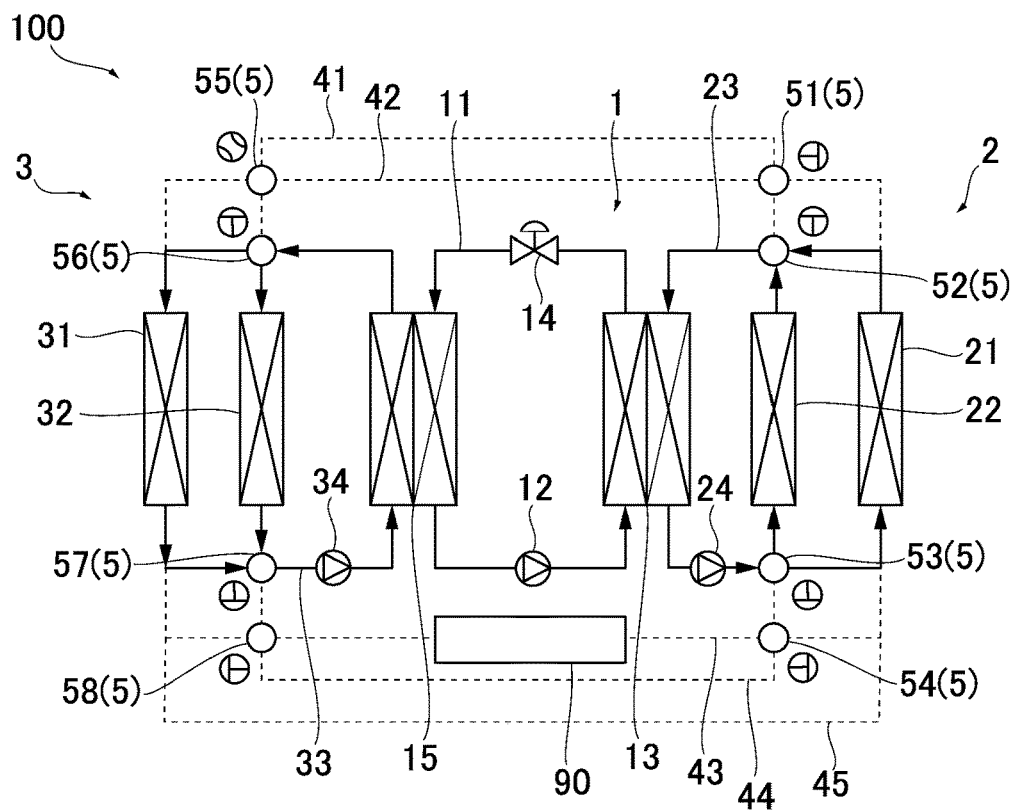
FIG. 3 is a system diagram showing a configuration of the air conditioning device for the vehicle according to the embodiment of the present disclosure and is a diagram showing a state in which the first vehicle interior heat exchanger (cooler core) is defrosted.

In FIGS. 1 to 3, the reference numerals attached in the vicinity of each switching unit 5 indicate the open state of each switching unit 5. Hereinafter, a detailed configuration of the switching unit 5 will be described with reference to FIGS. 4 to 13 and an example of the operation mode of the air conditioning device 100 for the vehicle will be described with reference to FIGS. 1 to 3 according to the open state indicated by the reference numerals.

(Configuration of Switching Unit)

Figure 4:
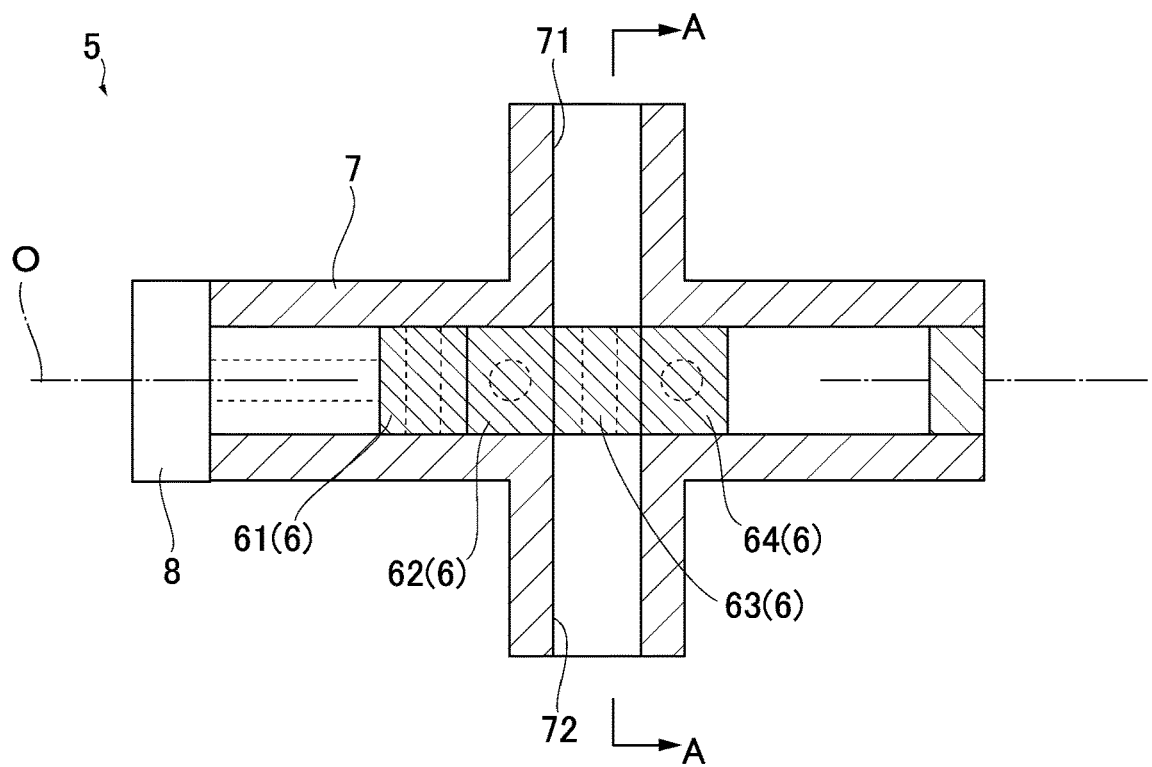
FIG. 4 is a cross-sectional view showing a configuration of a valve device as a switching unit according to the embodiment of the present disclosure.

As shown in FIG. 4, the switching unit 5 includes a plurality of (four) valve bodies 6, a valve casing 7 which accommodates these valve bodies 6 and forms a plurality of (four) flow paths 71, 72, 73, and 74, and an actuator 8 which drives the valve body 6.

Each valve body 6 has a columnar shape extending along the axis O. Four valve bodies 6 are arranged in the valve casing 7 in the direction of the axis O. Each valve body 6 is driven by the actuator 8 to be movable in a reciprocating manner along the axis O in the valve casing 7 and rotatable around the axis O. That is, when the valve body 6 is moved in a reciprocating manner in the direction of the axis O, any one of four valve bodies 6 having different shapes can be selectively used. A detailed configuration of each valve body 6 will be described later.

Figure 5:
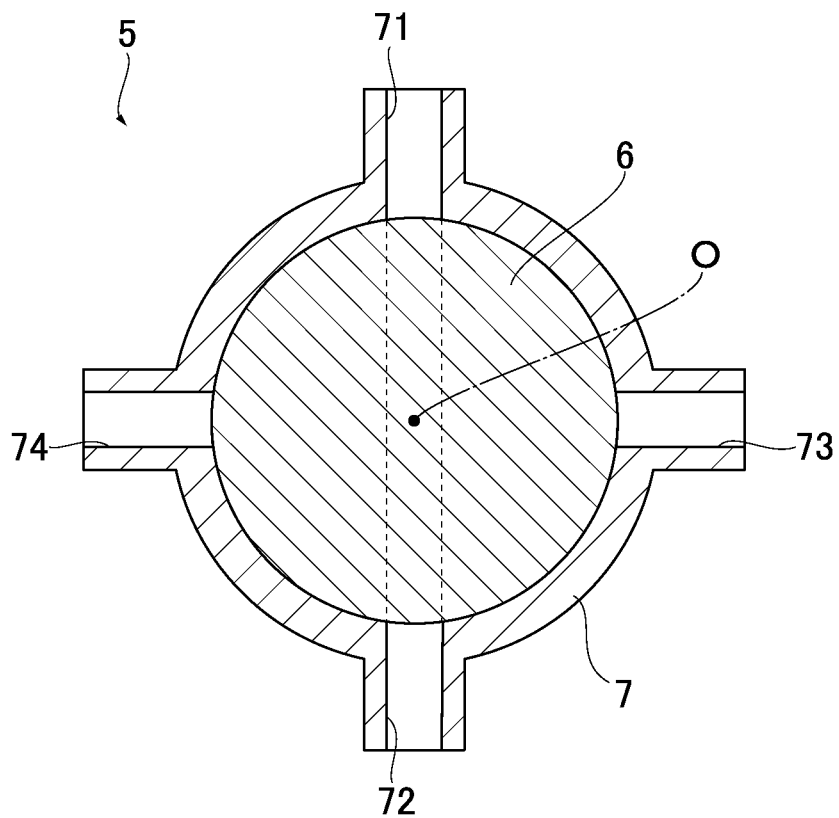
FIG. 5 is a cross-sectional view taken along the line A-A of FIG. 4.

The valve casing 7 is formed in a tubular shape which covers four valve bodies 6 from the outer peripheral side with respect to the axis O. Further, as shown in FIG. 5, the valve casing 7 is provided with four flow paths 71, 72, 73, and 74 which communicate with at least one of the high-temperature heat medium circuit 2 and the low-temperature heat medium circuit 3. The flow paths 71, 72, 73, and 74 radially extend at intervals of 90° in the circumferential direction around the axis O. The positions of the flow paths 71, 72, 73, and 74 in the direction of the axis O are the same as each other.

Figure 6:
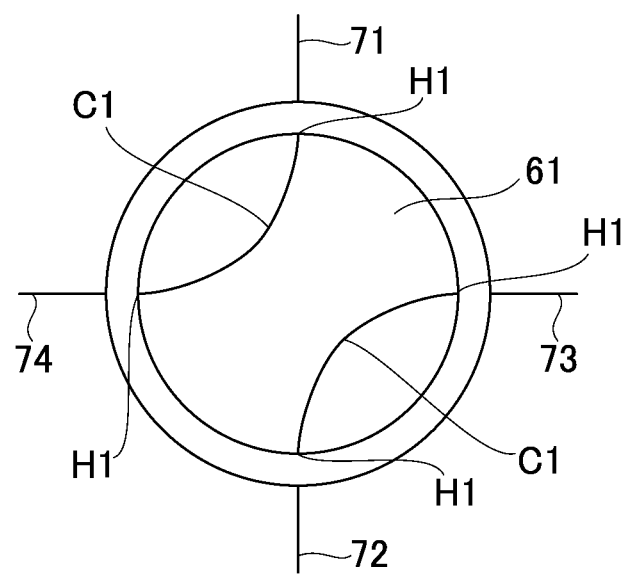
FIG. 6 is a schematic diagram showing a configuration of a first communication path of a first valve body.
Figure 7:
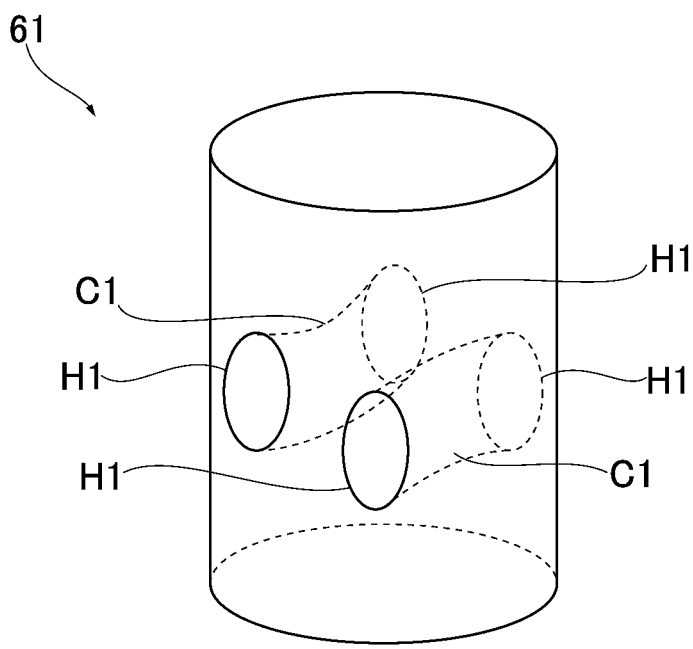
FIG. 7 is a perspective view showing a configuration of the first valve body.

As shown in FIGS. 6 and 7, four opening portions (first opening portions H1) which open in four directions at intervals of 90° in the circumferential direction with respect to the axis O are formed at one (first valve body 61) of four valve bodies 6. Further, the pair of first opening portions H1 adjacent to each other in the circumferential direction in these four first opening portions H1 communicates with each other by a first communication path C1 formed in the first valve body 61. FIG. 6 schematically shows the shape of the first valve body 61 and corresponds to the reference numerals shown in FIGS. 1 to 3. For example, in the first valve device 51, the second valve body 62 is selected and the high-temperature heat medium circuit 2, the first connection line 41, and the second connection line 42 are in the communication state by the posture of the second valve body 62. In the following description, the type and posture of the valve body 6 selected in this way are indicated by the reference numerals in FIGS. 1 to 3.

Figure 8:
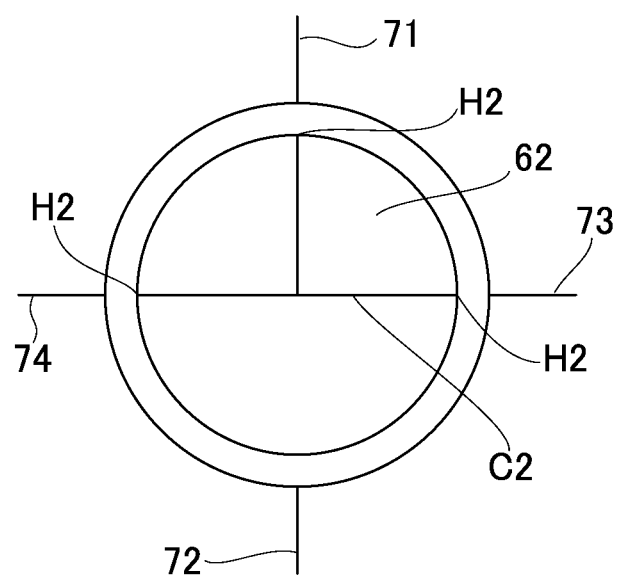
FIG. 8 is a schematic diagram showing a configuration of a second communication path of a second valve body.
Figure 9:
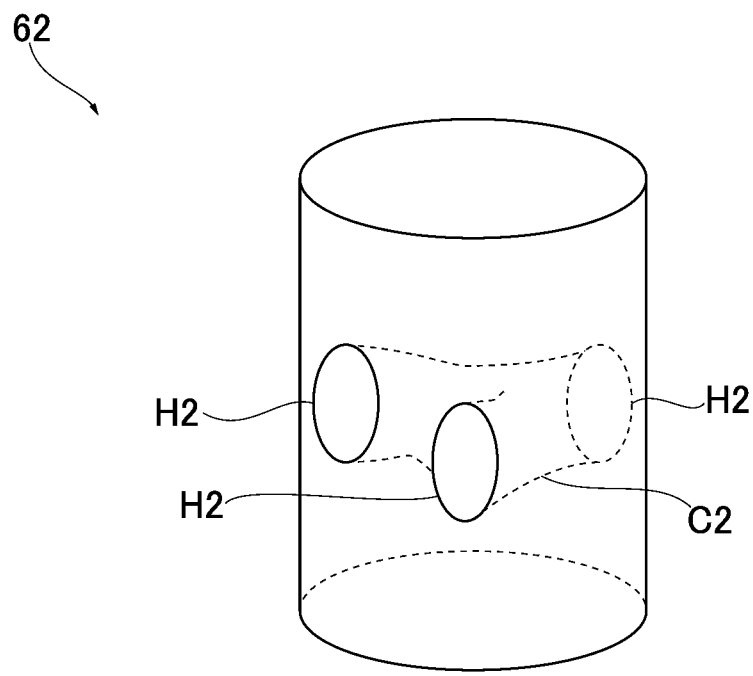
FIG. 9 is a perspective view showing a configuration of the second valve body.

As shown in FIGS. 8 and 9, three opening portions (second opening portions H2) which open in three directions at intervals in the circumferential direction with respect to the axis O are formed at one (second valve body 62) of four valve bodies 6. Further, these three second opening portions H2 communicate with each other by a second communication path C2 formed in the second valve body 62. Additionally, the circumferential gap between the second opening portions H2 is not constant. That is, the second communication path C2 has a T shape when viewed from the direction of the axis O. Thus, only any three flow paths of four flow paths 71, 72, 73, and 74 communicate with each other by the second valve body 62. FIG. 8 schematically shows the shape of the second valve body 62 and corresponds to the reference numerals shown in FIGS. 1 to 3.

Figure 10:
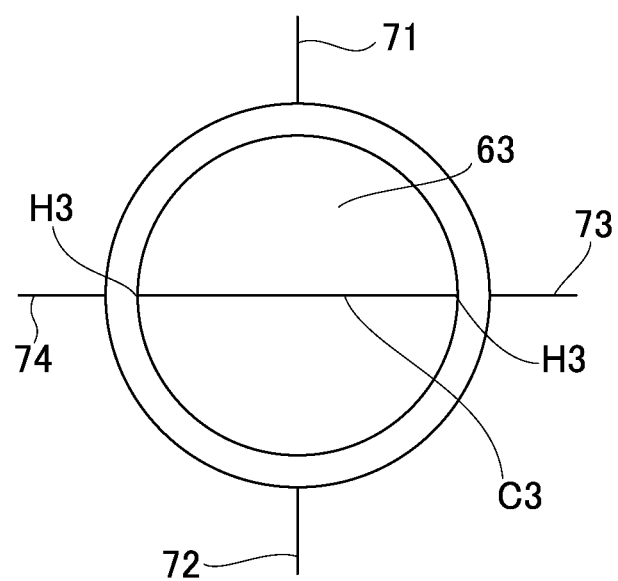
FIG. 10 is a schematic diagram showing a configuration of a third communication path of a third valve body.
Figure 11:
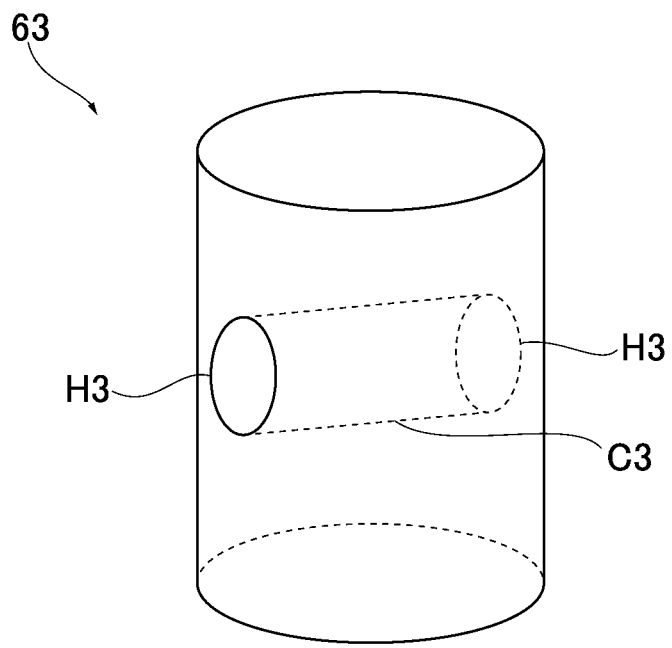
FIG. 11 is a perspective view showing a configuration of the third valve body.

As shown in FIGS. 10 and 11, two opening portions (third opening portions H3) which open in two directions at intervals of 180° in the circumferential direction with respect to the axis O are formed at one (third valve body 63) of four valve bodies 6.

Further, these third opening portions H3 communicate with each other by a third communication path C3 formed in the third valve body 63. Only any two flow paths of four flow paths 71, 72, 73, and 74 communicate with each other by the third valve body 63. FIG. 10 schematically shows the shape of the third valve body 63 and corresponds to the reference numerals shown in FIGS. 1 to 3.

Figure 12:
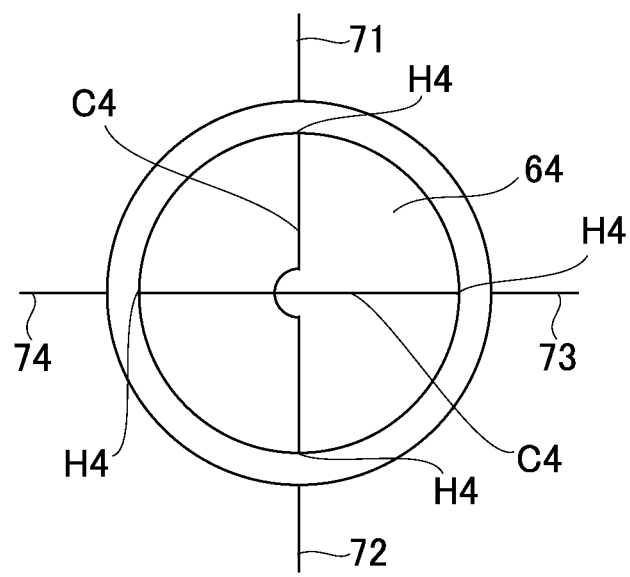
FIG. 12 is a schematic diagram showing a configuration of a fourth communication path of a fourth valve body.
Figure 13:
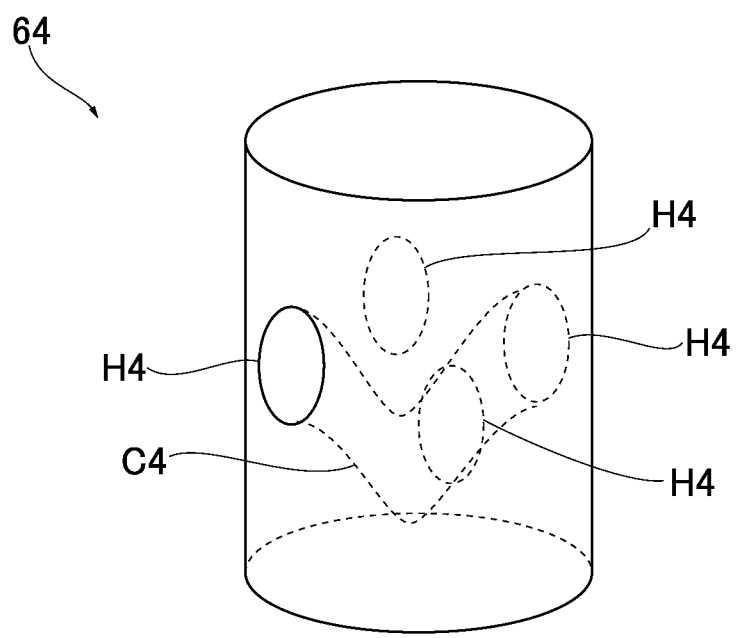
FIG. 13 is a perspective view showing a configuration of the fourth valve body.

As shown in FIGS. 12 and 13, four opening portions (fourth opening portions H4) which open in four directions at intervals of 90° in the circumferential direction with respect to the axis O are formed at one (fourth valve body 64) of four valve bodies 6. Further, the pair of fourth opening portions H4 located on both sides in the radial direction with respect to the axis O in these four fourth opening portions H4 communicates with each other by a fourth communication path C4 formed in each fourth valve body 64. Two fourth communication paths C4 are respectively curved not to interfere with each other in the direction of the axis O in the fourth valve body 64. Additionally, in FIG. 13, in order to avoid complication of illustration, only one fourth communication path C4 is shown and the other fourth communication path C4 is not shown. Only any two flow paths of four flow paths 71, 72, 73, and 74 communicate with each other by the fourth valve body 64. FIG. 12 schematically shows the shape of the fourth valve body 64 and corresponds to the reference numerals shown in FIGS. 1 to 3.

(Freezing Mode/Defrosting Drying Mode)

Next, the operation of the "freezing mode" and the "defrosting drying mode" which is one of the operation modes of the air conditioning device 100 for the vehicle will be described with reference to FIG. 1. Additionally, the flow paths of the refrigerant and the cooling water described below are realized by setting each switching unit 5 to the state shown by the reference numeral in FIG. 1.

The freezing mode and the defrosting drying mode are also performed for the purpose of cleaning the vehicle interior side heat exchanger (the heater core 21 and the cooler core 22). When cleaning, first, the moisture in the air is condensed and frozen on the surface of the cooler core 22 (the first vehicle interior heat exchanger) (FIG. 1). Next, the surface of the cooler core 22 is washed by using the moisture melted by heating the cooler core 22 and is continuously further heated to perform the mode (defrosting drying mode) of drying the cooler core 22 and the freezing mode for the heater core 21 (the second vehicle interior heat exchanger) is performed (FIG. 2). Then, the heater core 21 is heated to perform the defrosting drying mode (FIG. 3). Hereinafter, the state of each drawing will be described.

In the state of FIG. 1, only the low-temperature cooling water flowing through the low-temperature heat medium circuit 3 flows into the cooler core 22 through the second connection line 42. Accordingly, the moisture generated on the surface of the cooler core 22 is frozen. The heat medium flowing out of the cooler core 22 is returned to the low-temperature heat medium circuit 3 through the fourth connection line 44.

In the state of FIG. 2, the low-temperature heat medium flowing through the low-temperature heat medium circuit 3 flows into only the heater core 21 through the second connection line 42. Accordingly, the moisture generated on the surface of the heater core 21 is frozen. On the other hand, at this time, a heat medium that has become hot due to heat exchange with the refrigerant in the condenser 13 flows into the cooler core 22. Thus, the moisture frozen on the surface of the cooler core 22 is heated and melted (defrosted). Adhesions such as bacteria and dust captured with moisture during freezing are washed away with moisture during melting. After that, the cooler core 22 is dried by continuing heating. That is, this operation cleans the surface of the heater core 21 and suppresses the generation of bacteria and mold in accordance with drying.

Next, in the state of FIG. 3, a heat medium that has become hot due to heat exchange with the refrigerant in the condenser 13 flows into the heater core 21. Thus, the moisture frozen on the surface of the heater core 21 is heated and melted (defrosted). Adhesions such as bacteria and dust captured with moisture during freezing are washed away with moisture during melting. Then, the heater core 21 is continuously further heated to be dried. That is, the surface of the cooler core 22 is cleaned by this operation and the generation of bacteria and mold is suppressed in accordance with drying.

(Operation and Effect)

As described above, according to this embodiment, in the freezing mode, only the low-temperature heat medium is supplied from the low-temperature heat medium circuit 3 to the heater core 21 or the cooler core 22 which is the vehicle interior heat exchanger. Accordingly, the moisture condensed on the surface of the heater core 21 or the cooler core 22 is frozen. At this time, the bacteria and mold had grown on the surface are frozen together with the moisture. Then, the cooling water that has become hot by the heat exchange with the refrigerant in the condenser 13 by performing the defrosting drying mode is supplied to the heater core 21 or the cooler core 22.

Accordingly, the frozen moisture is melted (defrosted). As a result, adhesions such as bacteria and dust captured with moisture during freezing can be washed away with moisture. After that, the heater core 21 or the cooler core 22 is dried by continuing heating. As a result, the generation of the bacteria and mold is suppressed. Thus, it is possible to perform a hygienic operation of the air conditioning device 100 for the vehicle for a longer period.

In addition, according to the above-described configuration, it is possible to switch the communication states of the plurality of flow paths 71, 72, 73, and 74 by moving the plurality of valve bodies 6 in a reciprocating manner in the direction of the axis O or rotating the valve casing around the axis O in the valve casing 7. In particular, since a plurality of required valve devices (switching unit 5) can be unified into only one configuration, the number of parts can be reduced. Further, it is possible to omit the step of selecting and installing an appropriate type from a plurality of types of valve devices at the time of manufacturing. As a result, it is possible to reduce the manufacturing cost or the maintenance cost.

According to the above-described configuration, it is possible to communicate a pair of adjacent flow paths of four flow paths 71, 72, 73, and 74 through the first communication path C1 by the first valve body 61. Further, it is possible to selectively communicate two flow paths of four flow paths 71, 72, 73, and 74 by rotating the first valve body 61 around the axis O. Accordingly, it is possible to switch the communication states of the flow paths 71, 72, 73, and 74 with a high degree of freedom.

According to the above-described configuration, it is possible to communicate three flow paths of four flow paths 71, 72, 73, and 74 through the second communication path C2 by the second valve body 62. Further, it is possible to selectively communicate three flow paths of four flow paths 71, 72, 73, and 74 by rotating the second valve body 62 around the axis O. Accordingly, it is possible to switch the communication states of the flow paths 71, 72, 73, and 74 with a high degree of freedom.

According to the above-described configuration, it is possible to communicate two flow paths of four flow paths 71, 72, 73, and 74 through the third communication path C3 by the third valve body 63. Further, it is possible to selectively communicate two flow paths of four flow paths 71, 72, 73, and 74 by rotating the third valve body 63 around the axis O. Accordingly, it is possible to switch the communication states of the flow paths 71, 72, 73, and 74 with a high degree of freedom.

According to the above-described configuration, it is possible to communicate two flow paths located on both sides in the radial direction of four flow paths 71, 72, 73, and 74 through the fourth communication path C4 by the fourth valve body 64. Further, it is possible to selectively communicate two flow paths of four flow paths 71, 72, 73, and 74 by rotating the fourth valve body 64 around the axis O. Accordingly, it is possible to switch the communication states of the flow paths 71, 72, 73, and 74 with a high degree of freedom.

OTHER EMBODIMENTS

The embodiments of the present disclosure have been described in detail with reference to the drawings. Additionally, the specific configuration is not limited to the above embodiments and includes design changes and the like within a range that does not deviate from the gist of the present disclosure. For example, it is possible to operate the air conditioning device 100 for the vehicle in other modes including not only the strong heating mode and the heating defrosting mode but also the cooling mode and the like by appropriately switching the state of each switching unit 5.

Further, in the above-described embodiments, an example in which the freezing mode and the defrosting drying mode are sequentially performed by the pair of heater cores 21 has been described. However, these modes may be performed simultaneously by the pair of heater cores 21 or may be performed in the reverse order of the above-described embodiments.

[Appendix] The air conditioning device 100 for the vehicle described in each embodiment is grasped as follows, for example.

(1) The air conditioning device 100 for the vehicle according to a first aspect includes: the refrigeration cycle 1 including the compressor 12, the condenser 13, the expansion valve 14, and the evaporator 15 through which a refrigerant is sequentially flowed; the high-temperature heat medium circuit 2 through which the high-temperature heat medium has exchanged heat with the refrigerant in the condenser 13 is circulated; the low-temperature heat medium circuit 3 through which the low-temperature heat medium has exchanged heat with the refrigerant in the evaporator 15 is circulated; the connection lines 41, 42, 43, 44, and 45 connecting the high-temperature heat medium circuit 2 to the low-temperature heat medium circuit 3; the plurality of vehicle interior heat exchangers 21 and 22 which are allowed to be introduced the heat medium thereinto; the plurality of vehicle exterior heat exchangers 31 and 32 which are allowed to be introduced the heat medium thereinto; and the switching unit 5 which is configured to switch the operation state of the air conditioning device to a first mode allowing to connect the vehicle interior heat exchangers to the high-temperature heat medium circuit 2, a second mode allowing to connect the vehicle interior heat exchangers to the low-temperature heat medium circuit 3, and a third mode not allowing to connect the vehicle interior heat exchangers to any one of the high-temperature heat medium circuit 2 and the low-temperature heat medium circuit 3.

According to the above-described configuration, in the freezing mode, only the low-temperature heat medium is supplied from the low-temperature heat medium circuit 3 to the heater core 21 or the cooler core 22 which is the vehicle interior heat exchanger. Accordingly, the moisture condensed on the surface of the heater core 21 or the cooler core 22 is frozen. At this time, adhesions such as bacteria and mold had grown on the surface are frozen together with the moisture. Then, the heat medium that has become hot by the heat exchange with the refrigerant in the condenser 13 by performing the defrosting drying mode is supplied to the heater core 21 or the cooler core 22. Accordingly, the frozen moisture is melted (defrosted). As a result, adhesions such as bacteria and dust captured with moisture during freezing are washed away with moisture and the surface of the heater core 21 or the cooler core 22 is dried. That is, the surface of the heater core 21 or the cooler core 22 is cleaned by this operation and the generation of bacteria and mold is suppressed in accordance with drying.

(2) In the air conditioning device 100 for the vehicle according to a second aspect, the high-temperature heat medium circuit 2 includes the first and second vehicle interior heat exchangers (the cooler core 22 and the heater core 21), and wherein the switching unit 5 is configured to operate the air conditioning device in a freezing mode supplying only the heat medium from the low-temperature heat medium circuit 3 to at least one vehicle interior heat exchanger of the first and second vehicle interior heat exchangers and freezing a moisture generated on a surface of the vehicle interior heat exchanger.

According to the above-described configuration, it is possible to clean at least one of the first and second vehicle interior heat exchangers (the cooler core 22 and the heater core 21) by operating the air conditioning device in the freezing mode.

(3) In the air conditioning device 100 for the vehicle according to a third aspect, the switching unit 5 is configured to operate the air conditioning device in a defrosting mode supplying a heat medium, exchanging heat with the refrigerant in the condenser 13, to the vehicle interior heat exchanger to be heated and melting the frozen moisture after operating the air conditioning device in the freezing mode.

According to the above-described configuration, adhesions such as bacteria and dust captured with moisture during freezing are washed away with moisture during melting. By this operation, the surface of the vehicle interior heat exchanger can be cleaned.

(4) In the air conditioning device 100 for the vehicle according to a fourth aspect, the switching unit 5 is configured to operate the air conditioning device in a drying mode drying the surface of the vehicle interior heat exchanger by continuously further heating the vehicle interior heat exchanger after operating the air conditioning device in the defrosting mode.

According to the above-described configuration, adhesions such as bacteria and dust captured with moisture on the surface of the vehicle interior heat exchanger during the operation in the freezing mode are washed away with the moisture by the operation in the defrosting mode. Further, when the heating is continued in the drying mode, the surface of the vehicle interior heat exchanger is dried. In this way, it is possible to suppress the generation of bacteria and mold by drying the surface.

(5) In the air conditioning device 100 for the vehicle according to a fifth aspect, the switching unit 5 includes a plurality of valve devices which allows to change the flow states of the high-temperature heat medium circuit 2 and the low-temperature heat medium circuit 3, and wherein each of the plurality of valve devices includes the plurality of valve bodies 6 which are formed in a columnar shape centered on the axis O, are arranged in the direction of the axis O, and are rotatable around the axis O, the valve casing 7 which covers the plurality of valve bodies 6 and forms four flow paths 71, 72, 73, and 74 communicating with at least one of the high-temperature heat medium circuit 2 and the low-temperature heat medium circuit 3, and the actuator 8 which moves the plurality of valve bodies 6 in a reciprocating manner in the direction of the axis O and rotate the plurality of valve bodies around the axis O in the valve casing 7.

According to the above-described configuration, it is possible to switch the communication states of the plurality of flow paths 71, 72, 73, and 74 by moving the plurality of valve bodies 6 in a reciprocating manner in the direction of the axis O or rotating the plurality of valve bodies around the axis O in the valve casing 7. In particular, a plurality of required valve devices can be unified into only one configuration. Furthermore, since it is possible to easily increase the number of connection points, it is possible to ensure the expandability of the device. Further, it is possible to omit the step of selecting and installing an appropriate type from a plurality of types of valve devices at the time of manufacturing. As a result, it is possible to reduce the manufacturing cost or the maintenance cost.

(6) In the air conditioning device 100 for the vehicle according to a sixth aspect, one of the plurality of valve bodies 6 is the first valve body 61 in which the first opening portions H1 are formed to open in four directions at intervals in the circumferential direction with respect to the axis O and the first communication path C1 is formed to communicate the pair of first opening portions H1 adjacent to each other in the circumferential direction in the valve body 6.

According to the above-described configuration, it is possible to communicate a pair of adjacent flow paths of four flow paths 71, 72, 73, and 74 through the first communication path C1. Further, it is possible to selectively communicate two flow paths of four flow paths 71, 72, 73, and 74 by rotating the first valve body 61 around the axis O. Accordingly, it is possible to switch the communication states of the flow paths 71, 72, 73, and 74 with a high degree of freedom.

(7) In the air conditioning device 100 for the vehicle according to a seventh aspect, one of the plurality of valve bodies 6 is the second valve body 62 in which the second opening portions H2 are formed to open in three directions at intervals in the circumferential direction with respect to the axis O and the second communication path C2 is formed to communicate the three second opening portions H2 in the valve body 6.

According to the above-described configuration, it is possible to communicate three flow paths of four flow paths 71, 72, 73, and 74 through the second communication path C2. Further, it is possible to selectively communicate three flow paths of four flow paths 71, 72, 73, and 74 by rotating the second valve body 62 around the axis O. Accordingly, it is possible to switch the communication states of the flow paths 71, 72, 73, and 74 with a high degree of freedom.

(8) In the air conditioning device 100 for the vehicle according to an eighth aspect, one of the plurality of valve bodies 6 is the third valve body 63 in which the third opening portions H3 are formed to open in two directions at intervals in the circumferential direction with respect to the axis O and the third communication path C3 is formed to communicate the two third opening portions H3 in the valve body 6.

According to the above-described configuration, it is possible to communicate two flow paths of four flow paths 71, 72, 73, and 74 through the third communication path C3. Further, it is possible to selectively communicate two flow paths of four flow paths 71, 72, 73, and 74 by rotating the third valve body 63 around the axis O. Accordingly, it is possible to switch the communication states of the flow paths 71, 72, 73, and 74 with a high degree of freedom.

(9) In the air conditioning device 100 for the vehicle according to a ninth aspect, one of the plurality of valve bodies 6 is the fourth valve body 64 in which the fourth opening portions H4 are formed to open in four directions at intervals in the circumferential direction with respect to the axis O and the fourth communication path C4 is formed to communicate the pair of fourth opening portions H4 located on both sides in the radial direction with respect to the axis O in the valve body 6.

According to the above-described configuration, it is possible to communicate two flow paths located on both sides in the radial direction of four flow paths 71, 72, 73, and 74 through the fourth communication path C4. Further, it is possible to selectively communicate two flow paths of four flow paths 71, 72, 73, and 74 by rotating the fourth valve body 64 around the axis O. Accordingly, it is possible to switch the communication states of the flow paths 71, 72, 73, and 74 with a high degree of freedom.

INDUSTRIAL APPLICABILITY

According to the air conditioning device for the vehicle of the present disclosure, it is possible to perform a hygienic operation for a longer period.

REFERENCE SIGNS LIST

100 Air conditioning device for vehicle
1 Refrigeration cycle
2 High-temperature heat medium circuit
3 Low-temperature heat medium circuit
5 Switching unit
6 Valve body
7 Valve casing
8 Actuator
11 Refrigerant line
12 Compressor
13 Condenser
14 Expansion valve
15 Evaporator
21 Heater core
22 Cooler core
23 High-temperature heat medium line
24 High-temperature heat medium pump
31 First vehicle exterior heat exchanger
32 Second vehicle exterior heat exchanger
33 Low-temperature heat medium line
34 Low-temperature heat medium pump
41 First connection line
42 Second connection line
43 Third connection line
44 Fourth connection line
45 Fifth connection line
51 First valve device
52 Second valve device
53 Third valve device
54 Fourth valve device
55 Fifth valve device
56 Sixth valve device
57 Seventh valve device
58 Eighth valve device
61 First valve body
62 Second valve body
63 Third valve body
64 Fourth valve body
71, 72, 73, 74 Flow path
90 In-vehicle device
C1 First communication path
C2 Second communication path
C3 Third communication path
C4 Fourth communication path
H1 First opening portion
H2 Second opening portion
H3 Third opening portion
H4 Fourth opening portion
O Axis

The invention claimed is:
1. An air conditioning device for a vehicle comprising:
a refrigeration cycle including a compressor, a condenser, an expansion valve, and an evaporator through which a refrigerant is sequentially flowed;
a high-temperature heat medium circuit through which a high-temperature heat medium has exchanged heat with the refrigerant in the condenser is circulated;

a low-temperature heat medium circuit through which a low-temperature heat medium has exchanged heat with the refrigerant in the evaporator is circulated;
a connection line connecting the high-temperature heat medium circuit to the low-temperature heat medium circuit;
a plurality of vehicle interior heat exchangers which are allowed to be introduced the heat medium thereinto; and
a switching unit which is configured to switch an operation state of the air conditioning device to a first mode allowing to connect the vehicle interior heat exchangers to the high-temperature heat medium circuit, a second mode allowing to connect the vehicle interior heat exchangers to the low-temperature heat medium circuit, or a third mode not allowing to connect the vehicle interior heat exchangers to any one of the high-temperature heat medium circuit and the low-temperature heat medium circuit,
wherein the switching unit includes a plurality of valve devices which allows to change flow states of the high-temperature heat medium circuit and the low-temperature heat medium circuit, and
wherein each of the plurality of valve devices includes
a plurality of valve bodies which are formed in a columnar shape centered on an axis, are arranged in a direction of the axis, and are rotatable around the axis,
a valve casing which covers the plurality of valve bodies and forms four flow paths communicating with at least one of the high-temperature heat medium circuit and the low-temperature heat medium circuit, and
an actuator which moves the plurality of valve bodies in the direction of the axis in a reciprocating manner and rotates the plurality of valve bodies around the axis in the valve casing.

2. The air conditioning device for the vehicle according to claim 1,
wherein the high-temperature heat medium circuit includes the first and second vehicle interior heat exchangers among the plurality of vehicle interior heat exchangers, and
wherein the switching unit is configured to operate the air conditioning device in a freezing mode supplying only a heat medium from the low-temperature heat medium circuit to at least one vehicle interior heat exchanger of the first and second vehicle interior heat exchangers and freezing a moisture generated on a surface of the vehicle interior heat exchanger.

3. The air conditioning device for the vehicle according to claim 2,
wherein the switching unit is configured to operate the air conditioning device in a defrosting mode supplying a heat medium, which has exchanged heat with the refrigerant in the condenser, to the one vehicle interior heat exchanger to be heated and melting the frozen moisture after operating the air conditioning device in the freezing mode.

4. The air conditioning device for the vehicle according to claim 3,
wherein the switching unit is configured to operate the air conditioning device in a drying mode drying the surface of the vehicle interior heat exchanger by continuously further heating the vehicle interior heat exchanger after operating the air conditioning device in the defrosting mode.

5. The air conditioning device for the vehicle according to claim 1,
wherein one of the plurality of valve bodies is a first valve body in which first opening portions are formed to open in four directions at intervals in a circumferential direction with respect to the axis and a first communication path is formed to communicate a pair of the first opening portions adjacent to each other in the circumferential direction in the valve body.

6. The air conditioning device for the vehicle according to claim 1,
wherein one of the plurality of valve bodies is a second valve body in which second opening portions are formed to open in three directions at intervals in a circumferential direction with respect to the axis and a second communication path is formed to communicate the three second opening portions in the valve body.

7. The air conditioning device for the vehicle according to claim 1,
wherein one of the plurality of valve bodies is a third valve body in which third opening portions are formed to open in two directions at intervals in a circumferential direction with respect to the axis and a third communication path is formed to communicate the two third opening portions in the valve body.

8. The air conditioning device for the vehicle according to claim 1,
wherein one of the plurality of valve bodies is a fourth valve body in which fourth opening portions are formed to open in four directions at intervals in a circumferential direction with respect to the axis and a fourth communication path is formed to communicate the pair of fourth opening portions located on both sides in a radial direction with respect to the axis in the valve body.

9. The air conditioning device for the vehicle according to claim 2,
wherein the switching unit includes a plurality of valve devices which allows to change flow states of the high-temperature heat medium circuit and the low-temperature heat medium circuit, and wherein each of the plurality of valve devices includes
a plurality of valve bodies which are formed in a columnar shape centered on an axis, are arranged in a direction of the axis, and are rotatable around the axis,
a valve casing which covers the plurality of valve bodies and forms four flow paths communicating with at least one of the high-temperature heat medium circuit and the low-temperature heat medium circuit, and
an actuator which moves the plurality of valve bodies in the direction of the axis in a reciprocating manner and rotates the plurality of valve bodies around the axis in the valve casing.

10. The air conditioning device for the vehicle according to claim 3,
wherein the switching unit includes a plurality of valve devices which allows to change flow states of the high-temperature heat medium circuit and the low-temperature heat medium circuit, and wherein each of the plurality of valve devices includes
a plurality of valve bodies which are formed in a columnar shape centered on an axis, are arranged in a direction of the axis, and are rotatable around the axis, a valve casing which covers the plurality of valve bodies and forms four flow paths communicating with at least one of the high-temperature heat medium circuit and the low-temperature heat medium circuit, and an actuator which moves the plurality of valve bodies in the direction of the axis in a reciprocating manner and rotates the plurality of valve bodies around the axis in the valve casing.

11. The air conditioning device for the vehicle according to claim 4, wherein the switching unit includes a plurality of valve devices which allows to change flow states of the high-temperature heat medium circuit and the low-temperature heat medium circuit, and wherein each of the plurality of valve devices includes a plurality of valve bodies which are formed in a columnar shape centered on an axis, are arranged in a direction of the axis, and are rotatable around the axis, a valve casing which covers the plurality of valve bodies and forms four flow paths communicating with at least one of the high-temperature heat medium circuit and the low-temperature heat medium circuit, and an actuator which moves the plurality of valve bodies in the direction of the axis in a reciprocating manner and rotates the plurality of valve bodies around the axis in the valve casing.

12. The air conditioning device for the vehicle according to claim 5, wherein one of the plurality of valve bodies is a second valve body in which second opening portions are formed to open in three directions at intervals in a circumferential direction with respect to the axis and a second communication path is formed to communicate the three second opening portions in the valve body.

13. The air conditioning device for the vehicle according to claim 5, wherein one of the plurality of valve bodies is a third valve body in which third opening portions are formed to open in two directions at intervals in a circumferential direction with respect to the axis and a third communication path is formed to communicate the two third opening portions in the valve body.

14. The air conditioning device for the vehicle according to claim 6, wherein one of the plurality of valve bodies is a third valve body in which third opening portions are formed to open in two directions at intervals in a circumferential direction with respect to the axis and a third communication path is formed to communicate the two third opening portions in the valve body.

15. The air conditioning device for the vehicle according to claim 5, wherein one of the plurality of valve bodies is a fourth valve body in which fourth opening portions are formed to open in four directions at intervals in a circumferential direction with respect to the axis and a fourth communication path is formed to communicate the pair of fourth opening portions located on both sides in a radial direction with respect to the axis in the valve body.

16. The air conditioning device for the vehicle according to claim 6, wherein one of the plurality of valve bodies is a fourth valve body in which fourth opening portions are formed to open in four directions at intervals in a circumferential direction with respect to the axis and a fourth communication path is formed to communicate the pair of fourth opening portions located on both sides in a radial direction with respect to the axis in the valve body.

17. The air conditioning device for the vehicle according to claim 7, wherein one of the plurality of valve bodies is a fourth valve body in which fourth opening portions are formed to open in four directions at intervals in a circumferential direction with respect to the axis and a fourth communication path is formed to communicate the pair of fourth opening portions located on both sides in a radial direction with respect to the axis in the valve body.

* * * * *